(12) United States Patent
Vohmann et al.

(10) Patent No.: US 6,217,478 B1
(45) Date of Patent: Apr. 17, 2001

(54) POSITION AND/OR ANGLE CONTROL METHOD AND DEVICE WITHOUT ABSOLUTE POSITIONS SENSOR

(75) Inventors: Martin Vohmann, Esslingen; Ralf Dreibholz, Meckenbeuren; Gunther Bauer, Tettnang, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/350,338

(22) Filed: Jul. 9, 1999

(30) Foreign Application Priority Data

Jul. 14, 1998 (DE) .............................. 198 31 502

(51) Int. Cl.7 .................................. B60K 41/14
(52) U.S. Cl. ............................... 477/50
(58) Field of Search .................................. 477/50

(56) References Cited

U.S. PATENT DOCUMENTS 5,669,845 * 9/1997 Muramoto et al. .............. 477/50
6,052,637 * 4/2000 Amsallen et al. ................ 477/50

FOREIGN PATENT DOCUMENTS

| 26 34 887 | 3/1977 | (DE) . |
| 32 37 498 A1 | 4/1984 | (DE) . |
| 31 07 442 C2 | 10/1988 | (DE) . |
| 38 29 405 A1 | 3/1990 | (DE) . |
| 44 26 467 A1 | 2/1995 | (DE) . |
| 195 08 793 A1 | 9/1996 | (DE) . |
| 195 23 210 C1 | 10/1996 | (DE) . |
| 197 32 084 | 7/1997 | (DE) . |

OTHER PUBLICATIONS

*TPU Reference Manual*, Time Processor Unit, Motorola 3–100, 4 pp.

Zykla, Wolfram: "Positionieren mit Schrittmotoren". In: elektrische ausrüstung, Nr. 4, Aug. 1976, S. 18–021.

* cited by examiner

*Primary Examiner*—Sherry Estremsky
(74) *Attorney, Agent, or Firm*—Davis & Bujold, P.L.L.C.

(57) ABSTRACT

A method for control of a positioning and/or angle control device without an absolute position sensor and the device itself is proposed as having at least one position label for a controllable part in a motor vehicle using an electronic circuit. The positioning and/or angle control device initialized after termination of the operation of the motor vehicle.

20 Claims, 1 Drawing Sheet

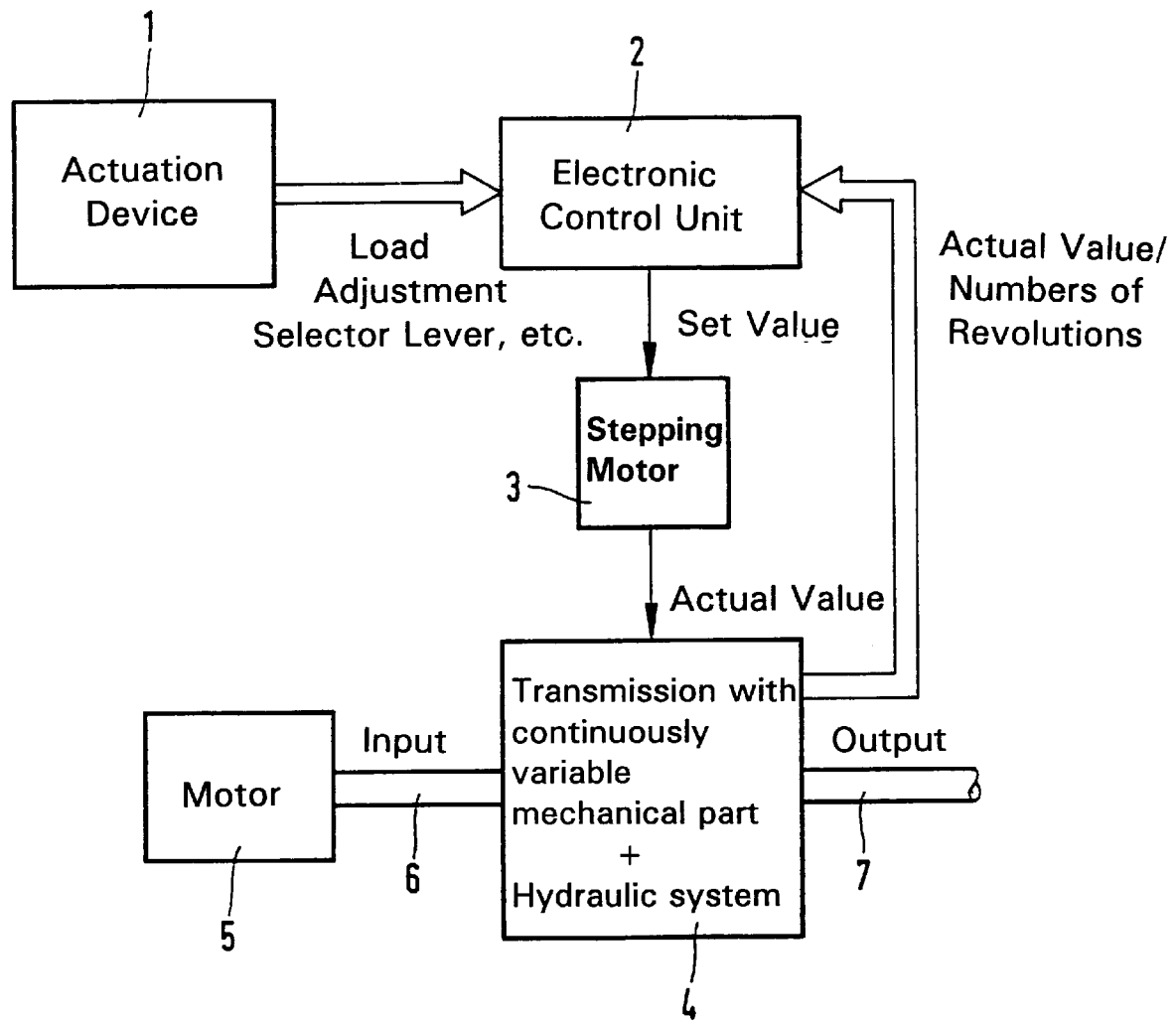

POSITION AND/OR ANGLE CONTROL METHOD AND DEVICE WITHOUT ABSOLUTE POSITIONS SENSOR

This invention concerns a method for control of a positioning and/or angle device without an absolute positioning sensor, but with at least one position index for a controllable part in a motor vehicle using an electronic circuit and the device itself.

BACKGROUND OF THE INVENTION

Positioning and/or angle control devices have many uses in the motor vehicle technique, e.g. as adjusting devices for clutches, for the control of oil flows, as set value sensors for actuators in steering systems, for an adjustment of active shock absorbers and for control of the adjustment of the speed ratio of transmissions such as continuously variable toroidal drives or continuously variable transmissions (CVT transmissions).

As positioning and/or angle control devices units are often used which does not make possible a detection or feedback of the absolute position, e.g. in stepping motors. But since this absolute position becomes necessary for the use of control and regulation strategies, there have been already used among others the following possibilities:

a) external, separate measurement or detection of the absolute position;
b) continuous incremental detection occasionally, regularly, or at specific moments (e.g. initializing) of the absolute position in certain prominent positions (stops, additional/missing transmission detection among others);
c) continuous incremental detection by taking into account the position departing from the set nominal value and detection of the absolute position like in b);
d) determination from other detected system factors; this is possible only when a clear, sufficiently precise relationship exists;
e) a combination of the above methods.

For stepping motors a method according to c) is generally used (see also the publication of the firm Motorola Inc., 1990 "TPU Time Processor Unit Reference Manual", chapter 3, page 103). In this initializing method described therein for a stepping motor, the latter is transferred from its momentary position to a preset basic position corresponding to a firm stop.

Especially in the motor vehicle technology it must be ensured that the divergences of the calculated from the real position (called "step errors" in stepping motors), which appear during the operation between the moments of the absolute position detection do not exceed an admissible measure. Such step errors can result, e.g. from the fact that due to vibrations high counterforces result which cannot be overcome by the electromotive force of the stepping motor associated therewith is important, since thereon directly depends the accurate control of the part, e.g. the adjustment of the reduction ratio of a continuously variable transmission in a motor vehicle. Incorrect adjustments of the speed ratio can result in too high or too low numbers of revolutions of the motor and therewith comfort impairment and also elevated fuel consumption. Besides, no adjusting power should act during stoppage on the continuously variable toroidal drive, since this can lead to mechanical damage.

SUMMARY OF THE INVENTION

Therefore, the problem to be solved by this invention is to provide a method for control of a positioning and/or angle adjustment device and the device itself with which an accurate adjustment of the absolute position of the positioning and/or angle control device is ensured in order thus to make possible an exact control of the part associated with the positioning and/or angle control device. But this must, as far as possible, be effected without damage to the service needs such as result from waiting periods while balancing the absolute position and taking into account special requirements in the motor vehicle.

This problem is solved by a method and a positioning and/or angle control device according to the invention.

Therefore, according to the invention, the method for control of a positioning and/or angle control device without an absolute position sensor consists in that the positioning and/or angle control device is initialized after termination of the operation of the motor vehicle. Thereby is advantageously obtained a detection or feedback to the electronic circuit concerning the absolute position. It is thus ensured, particularly in motor vehicle technology, that the divergences appearing during the calculation operation of the actual position between the moments of the absolute positioning detection do not exceed an admissible measure. In addition, there is obtained in this manner an exact adjustment of the absolute position of the positioning and/or angle control device without damage to the service needs such as waiting periods while balancing the absolute position.

In a preferred embodiment of the invention, it is proposed that the positioning and/or angle control device be advantageously a stepping motor designed for a controllable part such as a toroidal drive in a motor vehicle.

As mentioned at the beginning, such a method, the same as the positioning and/or angle control device, are adequate in multiple fields of use, but especially in motor vehicle technology. A preferred embodiment of such a method for control of a positioning and/or angle control device according to the invention is described herebelow in relation to the adjustment of the speed ratio of a continuously variable toroidal drive wherein positioning control device is provided as one having a stepping motor combined with a set value sensor.

Continuously variable toroidal drives with input and output discs situated coaxially relative to a common shaft and having toroidally designed inner surfaces wherein between the input and output discs, arranged in pairs, friction wheels are situated which can be actuated, via a hydraulically actuatable swiveling device, so that the reduction ratio can be continuously variable adjustable as has been described in the application DE 197 32 084.8.

BRIEF DESCRIPTION OF THE DRAWING

The enclosed block circuit diagram shows a schematic representation of this embodiment.

DESCRIPTION OF THE PREFERRED EMBODIMENT(S)

In the only FIGURE, with 1 is designated an actuation device which supplies to an electronic circuit 2 electric signals such as load positions of the transmission, the selector lever position, etc. The set value signal produced by the electronic circuit 2 is supplied to a stepping motor 3 which supplies an actual value signal to a hydraulic adjusting device associated with a mechanical transmission part in the continuously variable toroidal drive 4. The continuously variable transmission 4 is connected via an input shaft 6 with the motor 5 of the motor vehicle and via an output shaft 7 with the wheels to be driven of the motor vehicle. Electric actual value signals, e.g. relative to the number of revolutions of the continuously variable transmission 4, are likewise supplied by the latter to the electronic circuit 2. The stepping motor 3 is controlled, therefore, by the electronic circuit 2 to which are supplied the electric signals such as number of revolutions, load position, selector lever position (corresponding to the set gear sensor or program sensor), torques, etc.

The electronic circuit 2 has a storage element in which are continuously read in and retained actual parameters of the stepping motor position (=actual number of the issued steps relative to an initializing value) taking into account the actual speed ratio and other parameters even when the ignition is shut off. In addition, the electronic circuit 2 has a device which establishes whether the stored values are valid.

The electronic circuit 2 also has a control element which prevents the starting of the motor, i.e. the control element is a starter inhibitor. When the ignition of the motor vehicle is shut off, the supply voltage of the electronic circuit is still retained for a predetermined time period, preferably about 5 seconds. In the electronic circuit 2 is also provided a device which monitors the adjusting energy, i.e. the hydraulic pressure in the transmission, and issues a signal, the same as establishes, that no adjusting energy is any longer available in the transmission, e.g. by inquiring a sensor which indicates the stoppage of the motor.

To prevent for the driver a noticeable delay in the starting of the motor vehicle, for initializing when starting the vehicle, according to the invention, the reference had to store the value of the stepping motor position. On the other hand, the new initializing of the position is basically effected when the vehicle is stopped. On the contrary, if the switch unit establishes when starting the vehicle that the stored position value is not valid, then, diverging from the customary operation, the initializing is carried out immediately according to the following pattern, as it also is required, e.g. after the installation of a new battery in the vehicle after the initial assembly or also after the replacement of the whole transmission:

1. After switching in the ignition, i.e. after applying the supply voltage to the electronic circuit 2, the latter activates, e.g. a starter inhibitor so that no hydraulic pressure builds up in the transmission due to the running motor.
2. Wait until it is certain that there is no external energy supply in the continuously variable transmission 4, i.e. that no hydraulic pressure has built up due to the running motor.
3. The stepping motor 3 is moved to a reference stop adequate for the vehicle speed wherein is issued at least the step number that corresponds to the whole displacement range.
4. The stepping motor meter is now initialized with the reference value.
5. The stepping motor is then moved with the required number of steps to its new set position.
6. The starter inhibitor is deactivated.

Upon termination of the operation of the motor vehicle, i.e. when the ignition is shut off and the stored values are valid, the following steps are carried out:

1. After disconnecting the ignition, the starter inhibitor is activated so that no hydraulic pressure is retained in the continuously variable transmission 4 due to the still running motor.
2. Waiting until it is certain that no external energy supply is any longer available in the transmission, i.e. that a hydraulic pressure due to the running motor is prevented.

3. The stepping motor 3 is now moved to the next end stop wherein is to be issued at least the number of stage corresponding to the adjusting range to be expected.
4. The stepping motor meter is then initialized with the reference value.
5. The stepping motor 3 is moved with the required number of steps to its new set position.
6. The starter inhibitor is deactivated.

In a position value detected to be valid, the position of the stepping motor is approximately known so that only slight step errors are to be expected. Under normal circumstances, i.e. when the vehicle ignition is shut off, the set and actual positions are in the proximity of a stop. Therefore, the initializing process is advantageously terminated in less than 200 ms.

For monitoring during the operation of the motor vehicle, a comparator is provided in the electronic circuit 2 which compares the actual transmission state, e.g. the actual speed ratio, with the set state, e.g. the set speed ratio, and in the case of too great a divergence, triggers safety steps, e.g. switching the continuously variable transmission to the state without power flow. At the same time, it is only possible to activate the comparator when in the course of a certain period of time a stationary state has been detected.

| | Reference numerals |
|---|---|
| 1 | actuation device |
| 2 | electronic circuit |
| 3 | stepping motor |
| 4 | continuously variable transmission |
| 5 | vehicle motor |
| 6 | input shaft of the transmission |
| 7 | output shaft of the transmission |

What is claimed is:

1. A method for control of a positioning device of a motor vehicle without an absolute position sensor, the positioning device having a controllable part with at least one known position for maintaining the positioning device in a desired state, the method comprising the steps of:

initializing the positioning device after termination of operation of the motor vehicle by moving the positioning device precisely to the at least one known position;

storing the at least one known position of the position device as a reference value via an electronic circuit; and maintaining the reference value even when an ignition of the motor vehicle is turned shut off so that the reference value can be used when starting the motor vehicle.

2. The method according to claim 1 further comprising the steps of:

checking, upon starting the motor vehicle, whether the stored reference value is one of valid and void;

accounting for any restriction on the controllable part when initializing the position device;

checking to ensure that no hydraulic pressure is acting on the controllable part; and checking to ensure that no external power is acting on the controllable part.

3. The method according to claim 2 further comprising the step, upon starting the motor vehicle and determining that the stored reference value is void, performing a new initialization of the positioning device.

4. The method according to claim 2 further comprising the steps of:

preventing an undesired reaction of the controllable part due to the any restriction during initialization via a controller device;

preventing an undesired action of the initializing on the controllable part via the controller device; and verifying whether the conditions for performing the initialization have occurred by comparing a number of revolutions in the controllable part with a limit value, whereby the initialization is complete.

5. The method according to claim 4 further comprising the step of deactivating the controller device after the termination of the initialization.

6. The method according to claim 5 further comprising the step of verifying whether the conditions for performing the initialization have occurred by comparing a number of revolutions of a component connected to the controllable part with a limit value.

7. The method according to claim 6 further comprising the step of verifying whether the conditions for performing the initialization have occurred by comparing a measured parameter of a component unconnected to the controllable part with a limit value.

8. The method according to claim 7 further comprising the step of, after activation of the controller device, allowing a desired time period of time to elapse for preventing an undesired reaction of the controllable part.

9. The method according to claim 8 further comprising the step of performing the initializing only in the event that at least one of the following occurs:

the controller device for preventing the undesired reaction of the controllable part is activated; and detection of the conditions for performing the initialization have occurred.

10. The method according to claim 9 further comprising the step of, after disconnecting the ignition via the electronic control circuit, determining whether the controllable part is still supplied with an adjusting energy.

11. The method according to claim 10 further comprising the step of detecting incorrect position information by evaluating a measured parameter of at least one of the controllable part and the motor vehicle.

12. The method according to claim 11 further comprising the step of feeding, to the electronic circuit as measured parameters, at least one of a number of revolutions of a motor connected with a transmission, a load adjustment of the motor vehicle, a selector lever position of a transmission, and a torque developed by the motor.

13. The method according to claim 12 further comprising the step of, during the initializing, accounting for detection of several starting tests of the motor vehicle.

14. A method for control of a stepper motor of a motor vehicle without an absolute position sensor, the stepper motor being coupled to a reduction ratio control device of the drive train of the motor vehicle and the stepper motor having a rotor having at least one known position, the method comprising the steps of:

feeding at least one process parameter from the drive train of the motor vehicle to an electronic circuit connected to the stepper motor to facilitate control of the stepper motor;

continuously storing in the electronic circuit actual position values of the rotor and selected values of the reduction ratio control device controlled by the stepper motor;

establishing whether a stored position value in the electronic circuit is valid;

monitoring at least one function of the reduction ratio control device with the electronic circuit and optionally deactivating at least one selected function; and comparing with the electronic circuit an actual state of the reduction ratio control device with an appertaining set state and, in case predetermined difference between the actual state and the appertaining set state occurs, producing control signals for controlling reduction ratio control device.

15. A control apparatus for a positioning device controlling a reduction ratio control apparatus in a motor vehicle without an absolute position sensor, the positioning device having at least one known position for a controllable part, the control apparatus having an electronic circuit comprising:

a storage element in which are continuously stored actual values of a position of the positioning device and selected values of the continuously variable toroidal drive during a preset period of time;

a validity device for establishing the validity of values stored in the storage element;

a controller device for controlling the controllable part;

a monitoring device for monitoring desired functions of the continuously variable toroidal drive;

a comparator which compares an actual state of the continuously variable toroidal drive with a relative set state and if preset difference values between the actual state and the set state are exceeded, the comparator produces control signals for the controllable part of the positioning device to appropriately affect the state of the continuously variable toroidal drive; and communication means enabling the storage element, validity device, controller device, monitoring device, and comparator to communicate with each other.

16. The control apparatus of claim 15, wherein the controller device includes means for prevents inadmissible reactions of the continuously variable toroidal drive upon an initializing of the device.

17. The control apparatus of claim 15, wherein a controller device includes means for preventing inadmissible actions of the initializing on the continuously variable toroidal drive.

18. The control apparatus of claim 15, wherein the controller device is one of a starter inhibitor, a clutch, a brake and a valve.

19. The control apparatus of claim 15, wherein the reduction ratio control apparatus is a continuously variable toroidal drive.

20. The control apparatus of claim 15, wherein the positioning device is a stepper motor.

* * * * *